(12) United States Patent
Li et al.

(10) Patent No.: US 12,276,262 B2
(45) Date of Patent: Apr. 15, 2025

(54) WIND TURBINE AND ENERGY STORAGE COMBINED FREQUENCY REGULATION METHOD, AND WIND TURBINE AND ENERGY STORAGE COMBINED FREQUENCY REGULATION DEVICE

(71) Applicant: BEIJING GOLDWIND SCIENCE & CREATION WINDPOWER EQUIPMENT CO., LTD., Beijing (CN)

(72) Inventors: Feng Li, Beijing (CN); Shuang Jing, Beijing (CN)

(73) Assignee: BEIJING GOLDWIND SCIENCE & CREATION WINDPOWER EQUIPMENT CO., LTD., Beijing (CN)

( * ) Notice: Subject to any disclaimer, the term of this patent is extended or adjusted under 35 U.S.C. 154(b) by 0 days.

(21) Appl. No.: 18/689,422

(22) PCT Filed: Mar. 14, 2022

(86) PCT No.: PCT/CN2022/080601
§ 371 (c)(1),
(2) Date: Mar. 5, 2024

(87) PCT Pub. No.: WO2023/045272
PCT Pub. Date: Mar. 30, 2023

(65) Prior Publication Data
US 2025/0012253 A1      Jan. 9, 2025

(30) Foreign Application Priority Data

Sep. 22, 2021   (CN) .......................... 202111105246.1

(51) Int. Cl.
*F03D 7/02*      (2006.01)
*H02P 9/02*      (2006.01)

(52) U.S. Cl.
CPC ........... *F03D 7/028* (2013.01); *F03D 7/0224* (2013.01); *H02P 9/02* (2013.01); *F05B 2270/1033* (2013.01)

(58) Field of Classification Search
CPC .......... F03D 7/028; F03D 7/0224; H02P 9/02; F05B 2270/1033
See application file for complete search history.

(56) References Cited

U.S. PATENT DOCUMENTS

2011/0074151 A1*   3/2011   Burra ...................... H02J 3/241
                                                                        290/44
2012/0104753 A1*   5/2012   Nakashima ........... F03D 7/0284
                                                                        290/44
(Continued)

FOREIGN PATENT DOCUMENTS

CN          103036249 A   *   4/2013
CN          103718410 A        4/2014
(Continued)

OTHER PUBLICATIONS

International Search Report from related PCT Application No. PCT/CN2022/080601 dated Jun. 16, 2022, (6 pages).
(Continued)

*Primary Examiner* — Charles Cai
(74) *Attorney, Agent, or Firm* — Bayes PLLC

(57) ABSTRACT

A wind turbine and energy storage combined frequency regulation method and a wind turbine and energy storage combined frequency regulation device are disclosed. The wind turbine and energy storage combined frequency regulation method includes: determining a power increment required to be provided by a wind turbine and energy storage combined system; determining whether a rotor of a wind turbine is controllable; in response to determining that the rotor is controllable, generating a first power increment through a first mixed feedforward and feedback control
(Continued)

manner based on the determined power increment; while controlling the rotor, generating a second power increment based on the determined power increment; generating a third power increment through a second mixed feedforward and feedback control manner based on the determined power increment.

20 Claims, 8 Drawing Sheets

(56) References Cited

U.S. PATENT DOCUMENTS

| | | | |
|---|---|---|---|
| 2018/0335020 | A1 | 11/2018 | Ayiranazhi Cailakam et al. |
| 2023/0223760 | A1* | 7/2023 | Mendanha Pereira ... H02J 3/48 320/101 |

FOREIGN PATENT DOCUMENTS

| | | |
|---|---|---|
| CN | 104333037 A | 2/2015 |
| CN | 104736845 A | 6/2015 |
| CN | 105201741 A | 12/2015 |
| CN | 106374496 A | 2/2017 |
| CN | 106574604 A | 4/2017 |
| CN | 107947195 A | 4/2018 |
| CN | 107959304 A | 4/2018 |
| CN | 108123438 A | 6/2018 |
| CN | 108493960 A * | 9/2018 |
| CN | 108964086 A | 12/2018 |
| CN | 109209768 A | 1/2019 |
| CN | 109245639 A | 1/2019 |
| CN | 110518600 A | 11/2019 |
| CN | 111371104 A | 7/2020 |
| CN | 111900742 A | 11/2020 |
| CN | 112152242 A | 12/2020 |

OTHER PUBLICATIONS

Office Action in related Chinese Application No. 202111105246.1 dated Sep. 6, 2023 (10 pages).

Extended European Search Report in Related European Application No. 22871337.6 Dated Sep. 3, 2024 (9 Pages).

Choi, Jin Woo et al: "Hybrid Operation Strategy of Wind Energy Storage System for Power Grid Frequency Regulation", IET Generation, Transmission & Distribution, IET, UK, vol. 10, No. 3, Feb. 18, 2016, (14 Pages).

Fazeli, M et al: "Novel Control Scheme for Wind Generation With Energy Storage Supplying a Given Demand Power", Power Electronics and Motion Control Conference (EPE/PEMC), 2010 14th International, IEEE, Piscataway, NJ, USA, Sep. 6, 2010, (7 Pages).

Miao, Lu et al: "Coordinated Control Strategy of Wind Turbine Generator and Energy Storage Equipment for Frequency Support", 2014 IEEE Industry Application Society Annual Meeting, IEEE, Oct. 5, 2014 (7 Pages).

* cited by examiner

WIND TURBINE AND ENERGY STORAGE COMBINED FREQUENCY REGULATION METHOD, AND WIND TURBINE AND ENERGY STORAGE COMBINED FREQUENCY REGULATION DEVICE

CROSS-REFERENCE TO RELATED APPLICATIONS

This application is the national phase of International Application No. PCT/CN2022/080601, filed on Mar. 14, 2022, which claims the priority to Chinese Patent Application No. 202111105246.1, filed on Sep. 22, 2021. The entire contents of each of the above-identified applications are expressly incorporated herein by reference.

TECHNICAL FIELD

The present disclosure relates to the technical field of wind power generation, and in particular to a wind turbine and energy storage combined frequency regulation method and a wind turbine and energy storage combined frequency regulation device.

BACKGROUND

An electric grid requires that a wind turbine connected to the grid should have primary frequency regulation capabilities. That is to say, under a condition that the grid frequency exceeds a certain range of a rated frequency, a corresponding power increment is obtained based on a deviation between the grid frequency and the rated frequency, and the wind turbine needs to perform the power increment in a superimposed manner on the basis of a current power. After a power response is in place, even if a wind speed fluctuates, the power must remain stable and cannot exceed an error band, that is, a closed-loop control of the power is required. FIG. 1 is a diagram illustrating a conventional frequency regulation control process. The frequency regulation control process shown in FIG. 1 takes a direct-drive wind turbine as an example, and may also be applied to other types of wind turbines. As shown in FIG. 1, a grid frequency may be detected from a grid side of a converter, then a power increment is calculated, and a required power increment is generated by controlling a pitch system based on the calculated power increment.

FIG. 2 is a diagram illustrating a calculation curve of a frequency regulation power. The horizontal axis represents a grid frequency f, and the vertical axis represents a power P of a wind turbine. When f is at the zero point, it corresponds to a rated grid frequency (for example, 50 Hz), and at this time, the power P of the vertical axis corresponds to a current power of the wind turbine. Under a condition that the grid frequency exceeds ±0.2 Hz, the wind turbine is required to provide an additional power increment. For example, at f+0.7, the wind turbine is required to provide an additional power of −20% Pn (the rated power).

During normal operation, the wind turbine operates in a maximum power point tracking (MPPT) state, and there is a one-to-one correspondence between the wind speed and the power. Therefore, a power limiting operation may be achieved by controlling the pitch system to perform a pitch operation, so that the operating state of the wind turbine deviates from the MPPT, that is, the wind speed has a surplus compared to an actual power of the wind turbine. For example, in the MPPT operating state, a wind speed of 10 m/s may cause the wind turbine to generate 2000 KW power. Under a condition of power limiting, a wind speed of 10 m/s may cause the wind turbine to only generate 1000 KW power. By utilizing the power limiting operation, the wind turbine may perform a corresponding power increment under a condition that there is a positive deviation in the grid frequency. However, under a condition that there is a negative deviation in the grid frequency, the wind turbine cannot add more power if it operates under the MPPT state. In order to solve this problem, a usual approach is to make the wind turbine operate at non-MPPT state during normal operation, that is, to reserve a portion of the power in real time. In this way, under a condition that a negative frequency deviation occurs, the reserved portion of the power may be released by controlling the pitch system to perform a pitch operation, to achieve a purpose of increasing the power. FIG. 3 is a diagram illustrating an operation process of reserving a portion of a power of the wind turbine.

However, this solution of reserving a portion of the power will result in continuous loss of power generation, which will seriously affect the gain. On the other hand, existing solutions mostly use a pitch operation for frequency regulation, which will lead to a poor frequency regulation response performance due to a slow pitch response. The response time can be up to 5 s. During steady-state operation, if the wind speed fluctuates rapidly, the power may deviate from the error band due to slow frequency regulation response.

SUMMARY

Embodiments of the present disclosure provide a wind turbine and energy storage combined frequency regulation method and a wind turbine and energy storage combined frequency regulation device, which can improve a frequency regulation response speed and maintain stable grid-connected power.

In a general aspect, there is provided a wind turbine and energy storage combined frequency regulation method, including: in response to detecting a change in a grid frequency, determining a power increment required to be provided by a wind turbine and energy storage combined system, wherein the wind turbine and energy storage combined system includes a wind turbine and an energy storage device connected to the wind turbine; determining whether a rotor of the wind turbine is controllable; in response to determining that the rotor of the wind turbine is controllable, controlling the rotor of the wind turbine through a first mixed feedforward and feedback control manner based on the determined power increment, to generate a first power increment; while controlling the rotor of the wind turbine, controlling the energy storage device or both the energy storage device and a pitch system of the wind turbine based on the determined power increment, to generate a second power increment; in response to controlling the rotor of the wind turbine for a predetermined time period, stopping controlling the rotor of the wind turbine, and controlling the energy storage device or both the energy storage device and the pitch system through a second mixed feedforward and feedback control manner based on the determined power increment, to generate a third power increment, wherein the predetermined time period is a time period required for the second power increment to reach a steady state.

According to another aspect of the present disclosure, there is provided a wind turbine and energy storage combined frequency regulation device, including: a power increment determination unit configured to: in response to detecting a change in a grid frequency, determine a power increment required to be provided by a wind turbine and energy storage combined system, wherein the wind turbine and energy storage combined system includes a wind turbine and an energy storage device connected to the wind turbine; a rotor detection unit configured to: determine whether a rotor of the wind turbine is controllable; a rotor control unit configured to: in response to determining that the rotor of the wind turbine is controllable, control the rotor of the wind turbine through a first mixed feedforward and feedback control manner based on the determined power increment, to generate a first power increment; an energy storage and pitch control unit configured to: while controlling the rotor of the wind turbine, control the energy storage device or both the energy storage device and a pitch system of the wind turbine based on the determined power increment, to generate a second power increment; wherein in response to controlling the rotor of the wind turbine for a predetermined time period, the rotor control unit is configured to: stop controlling the rotor of the wind turbine; and the energy storage and pitch control unit is configured to: control the energy storage device or both the energy storage device and the pitch system through a second mixed feedforward and feedback control manner based on the determined power increment, to generate a third power increment, wherein the predetermined time period is a time period required for the second power increment to reach a steady state.

According to another aspect of the present disclosure, there is provided a controller, including: a processor; and a memory storing computer programs that, when executed by the processor, implement the wind turbine and energy storage combined frequency regulation method as described above.

According to another aspect of the present disclosure, there is provided a wind turbine and energy storage combined system, including: a wind turbine; an energy storage device connected to wind turbine; the controller as described above.

According to the wind turbine and energy storage combined frequency regulation method and the wind turbine and energy storage combined frequency regulation device of the present disclosure, when performing frequency regulation, the rotor of the wind turbine may be controlled first through a mixed feedforward and feedback control manner to generate a power increment, thereby improving a response speed. At the same time, due to a limited support time of the rotor, in order to avoid a fluctuation in a grid-connected power of the wind turbine caused by withdrawing control of the rotor, the energy storage device or both the energy storage device and the pitch system may be controlled at the same time to generate an additional power increment. At the same time, after the control of the rotor is withdrawn, the energy storage device or both the energy storage device and the pitch system may be controlled through a mixed feedforward and feedback control manner to generate a power increment and maintain stable grid-connected power of the wind turbine. In addition, under a condition that the rotor is uncontrollable, both the energy storage device and the pitch system may be controlled directly through the mixed feedforward and feedback control manner to generate a power increment, thereby improving the response speed and maintaining stable power through control of the energy storage device, and maintaining stable power through control of the pitch system.

BRIEF DESCRIPTION OF DRAWINGS

The above and other objects and features of embodiments of the present disclosure will become more apparent from the following description taken in conjunction with the accompanying drawings illustrating embodiments, in which.

DETAILED DESCRIPTION

Figure 1:
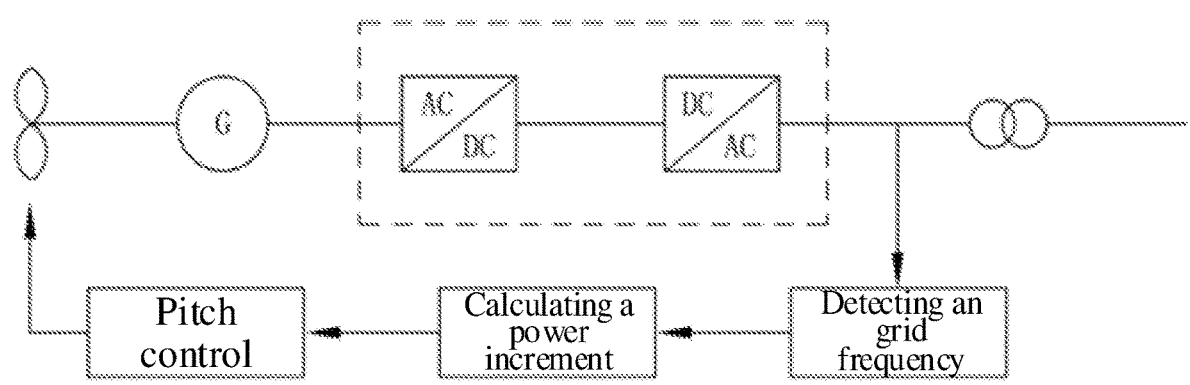
FIG. 1 is a diagram illustrating a conventional frequency regulation control process.
Figure 2:
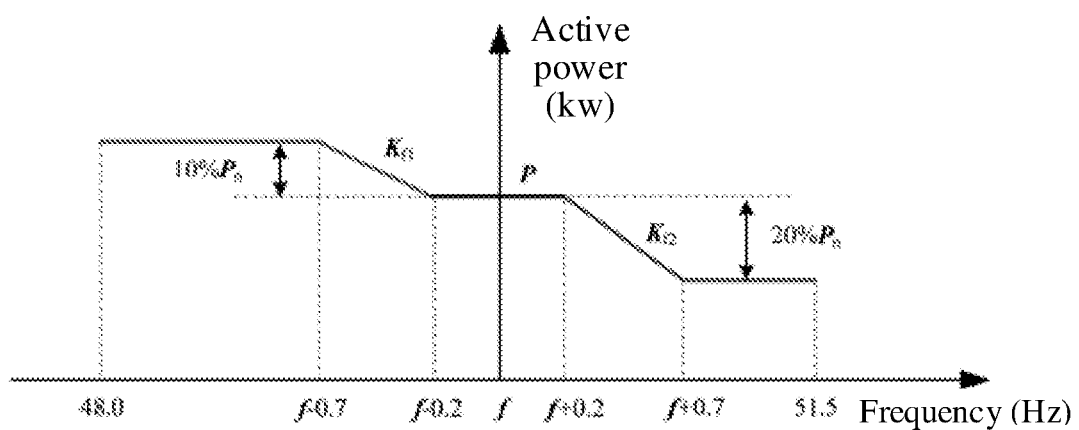
FIG. 2 is a diagram illustrating a calculation curve of a frequency regulation power.
Figure 3:
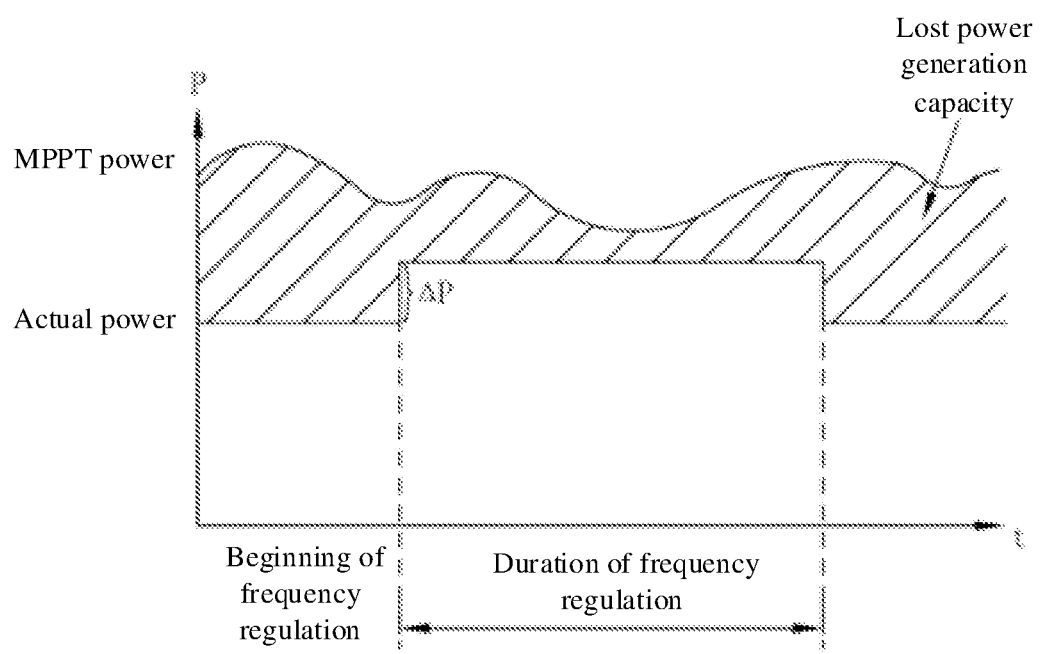
FIG. 3 is a diagram illustrating an operation process of reserving a portion of a power of a wind turbine.

The following embodiments are provided to assist the reader in gaining a comprehensive understanding of the methods, devices, and/or systems described herein. However, various alterations, modifications, and equivalents to the methods, devices, and/or systems described herein will be apparent upon understanding the disclosure of the present application. For example, the orders of operations described herein are merely examples and are not limited to those orders set forth herein, and other than operations that must occur in a specific order, changes may be made as will be apparent upon understanding the disclosure of the present application. Additionally, in order to improve clarity and conciseness, descriptions of features that would be known in the art may be omitted.

Features described herein may be implemented in different forms and are not to be construed as limited to the examples described herein. Rather, the examples described herein have been provided to illustrate only some of the many possible ways of implementing the methods, devices, and/or systems described herein, and the many possible ways will be apparent upon understanding the disclosure of the present application.

As used herein, the term "and/or" includes any one and any combination of two or more of the associated listed items.

Although terms such as "first", "second" and "third" may be used herein to describe various parts, components, regions, layers or portions, these parts, components, regions, layers or portions should not be restricted by these terms. Rather, these terms are only used to distinguish one part, component, region, layer or portion from another part, component, region, layer or portion. Thus, what is referred to as a first part, a first component, a first region, a first layer or a first portion in the examples described herein could also be referred to as a second part, a second component, a second region, a second layer or a second portion without departing from the teachings of the examples.

In the description, when an element (such as a layer, region, or substrate) is described as being "on" another element, "connected to" or "coupled to" another element, the element can be directly "on" another element, directly "connected to" or "coupled to" another element, or there may be one or more other intervening elements. In contrast, when an element is described as being "directly on" another element, "directly connected to" or "directly coupled to" another element, there may be no intervening elements.

The terms used herein are used only to describe various examples and are not intended to limit the present disclosure. The singular forms are intended to include the plural forms as well, unless the context clearly indicates otherwise. The terms "comprise", "include" and "having" indicate the presence of recited feature, quantities, operations, parts, elements and/or combinations thereof, but do not exclude the presence or addition of one or more other features, quantities, operations, parts, elements and/or combinations thereof.

Unless otherwise defined, all terms (including technical and scientific terms) used herein have the same meaning as commonly understood by one of ordinary skill in the art to which the present disclosure belongs after understanding the present disclosure. Unless expressly so defined herein, terms (such as terms defined in general dictionaries) should be construed to have meanings consistent with their meanings in the context of the relevant art and in the present disclosure, and should not be interpreted ideally or too formally.

Furthermore, in the exemplary description, when it is considered that a detailed description of a well-known related structure or function will cause an obscure interpretation of the present disclosure, such detailed description will be omitted.

A principle of a wind turbine and energy storage combined frequency regulation method according to an embodiment of the present disclosure is explained below.

Figure 4:
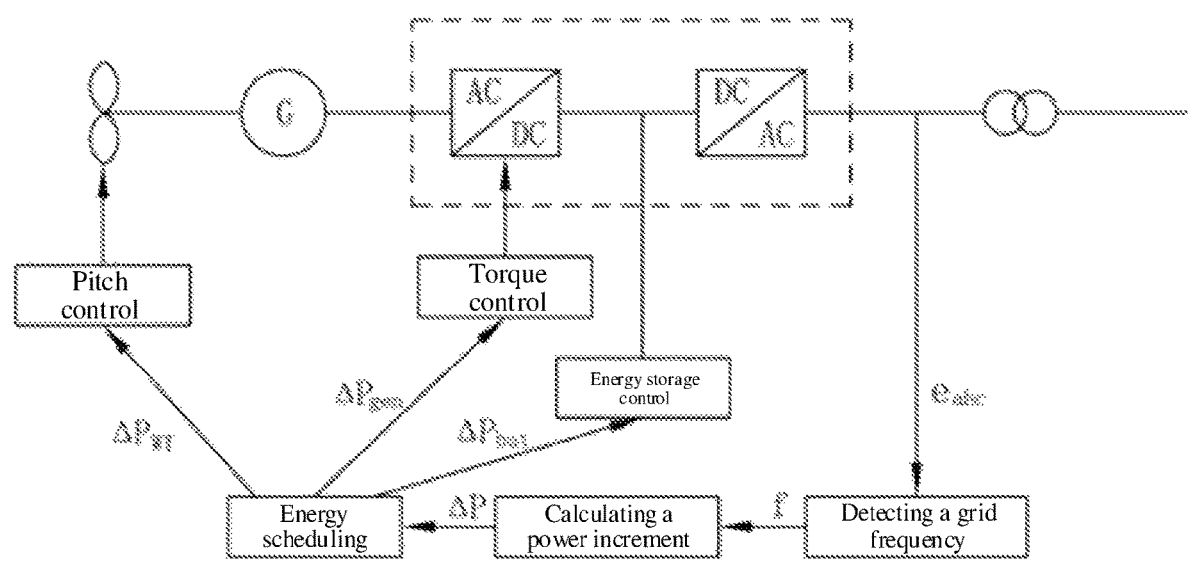
FIG. 4 is a diagram illustrating a principle of a wind turbine and energy storage combined frequency regulation method according to an embodiment of the present disclosure.

FIG. 4 is a diagram illustrating a principle of a wind turbine and energy storage combined frequency regulation method according to an embodiment of the present disclosure.

The wind turbine and energy storage combined frequency regulation method according to an embodiment of the present disclosure performs frequency regulation through a wind turbine and energy storage combined system including a wind turbine and an energy storage device connected to the wind turbine, which can avoid power generation loss and improve the performance of frequency regulation. In FIG. 4, the energy storage device is connected to a converter direct current (DC) bus, however the present disclosure is not limited thereto, and the energy storage device may also be connected to other locations.

Referring to FIG. 4, a grid voltage e_abc may be input to a frequency detection module to detect a grid frequency f. The grid frequency f may be detected from the grid voltage e_abc through various existing methods, however, the present disclosure is not limited in this regard. Then, based on an amount of change in the grid frequency f, a power increment $\Delta P$ required to be provided by the wind turbine and energy storage combined system may be determined using a predetermined frequency regulation power calculation curve. Next, the power increment $\Delta P$ may be decomposed through an energy scheduling algorithm to obtain three power increments $\Delta Pgen$, $\Delta Pbat$ and $\Delta Pwt$. Herein, $\Delta Pgen$ represents a power increment produced by controlling a rotor of the wind turbine, $\Delta Pbat$ represents a power increment produced by controlling the energy storage device, and $\Delta Pwt$ represents a power increment produced by controlling a pitch system.

$\Delta Pgen$, $\Delta Pbat$ and $\Delta Pwt$ may be used as a rotor control target, an energy storage control target and a pitch control target. The rotor, the energy storage device and the pitch system are controlled through a rotor control system, an energy storage control system and a pitch system to achieve a power response.

According to embodiments of the present disclosure, three devices (the rotor, the energy storage device, and the pitch system) are used to jointly respond to the power increment, and the coordination and distribution of power are realized through the energy scheduling algorithm. The rotor response has a fast speed and a short sustainable time, and is configured to improve a frequency response speed. The pitch system response has a slow speed and a long sustainable time, and is configured for frequency regulation power stabilization. The energy storage device response has a speed in the middle and a sustainable time in the middle, and may be configured to increase the speed or stabilize the power. The wind turbine and energy storage combined frequency regulation method according to an embodiment of the present disclosure is described in detail below.

Figure 5:
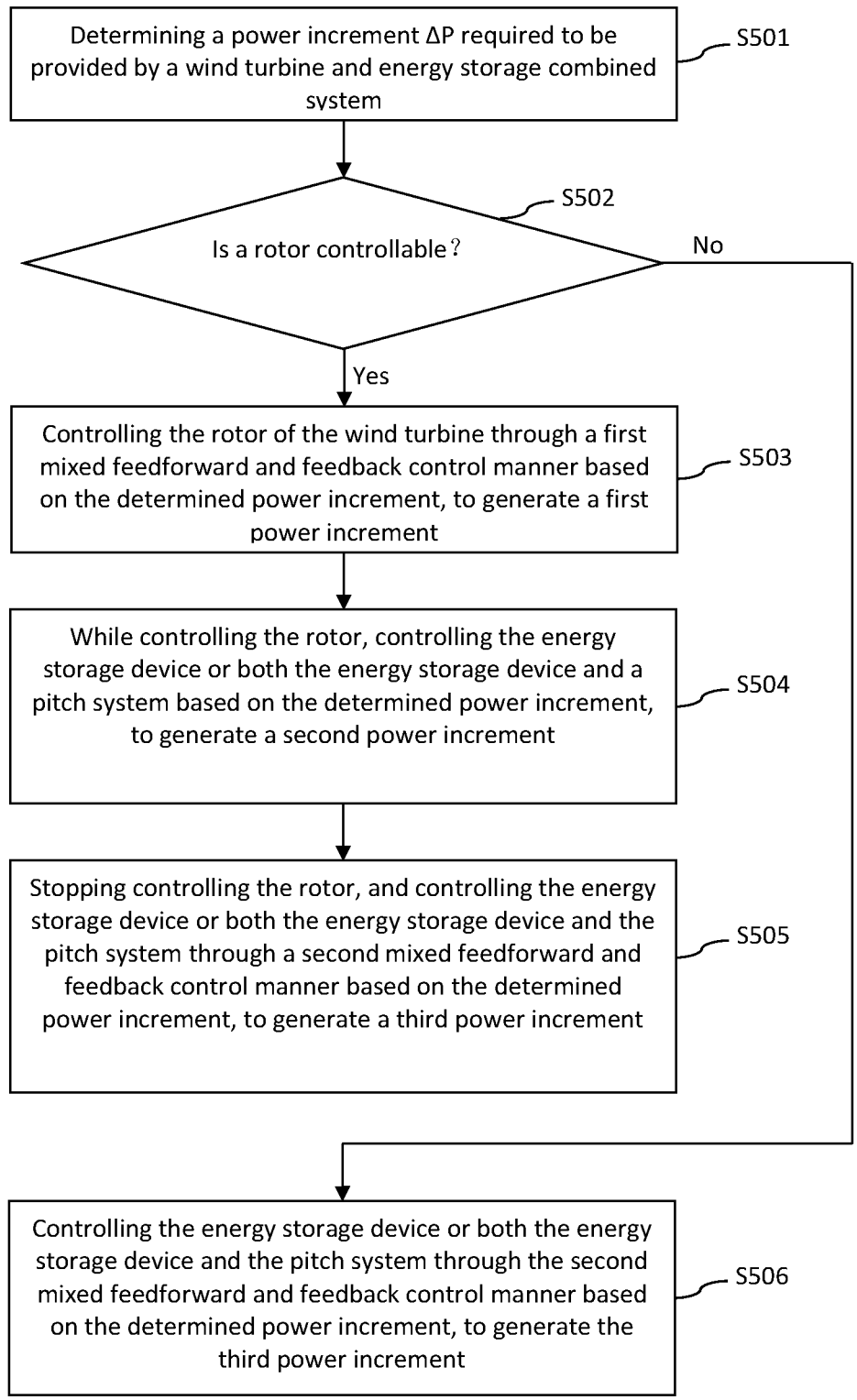
FIG. 5 is a flow chart illustrating a wind turbine and energy storage combined frequency regulation method according to an embodiment of the present disclosure.

FIG. 5 is a flow chart illustrating a wind turbine and energy storage combined frequency regulation method according to an embodiment of the present disclosure.

Referring to FIG. 5, in step S501, in response to detecting a change in a grid frequency, a power increment $\Delta P$ required to be provided by a wind turbine and energy storage combined system is determined. As described above, the wind turbine and energy storage combined system includes a wind turbine and an energy storage device connected to the wind turbine, and may use, based on an amount of change in the grid frequency, a predetermined frequency regulation power calculation curve to determine the power increment required to be provided by the wind turbine and energy storage combined system. Herein, the grid frequency may be detected from the grid voltage through various existing methods, and based on the detected grid frequency, whether the grid frequency changes may be determined, and an amount of change in the grid frequency may be determined.

Next, in step S502, it may be determined whether the rotor of the wind turbine is controllable. As described above, since the rotor has a fast response speed and may be configured to improve the frequency response speed, it may first be determined whether a corresponding power increment may be generated by controlling the rotor. However, because the rotor kinetic energy is closely related to the wind turbine power and load, under a condition that the wind turbine is in a specific state, the rotor kinetic energy is not available, that is, the rotor is uncontrollable. For example, under a condition that an output power of the wind turbine is less than or equal to a product of a rated power of the wind turbine and a predetermined coefficient, or under a condition that the output power of the wind turbine is greater than or equal to the rated power of the wind turbine, it may be determined that the rotor of the wind turbine is uncontrollable. Herein, the predetermined coefficient is a positive number less than 1, such as 0.1. Specifically, under a condition that the output power of the wind turbine is too low (for example, $\leq 10\%$ Pn), it may be determined that the rotor is uncontrollable, to prevent the wind turbine from shutting down or causing power backflow due to too low rotational speed; on the other hand, under a condition that the output power of the wind turbine is too high (for example, $\geq 100\%$ Pn), it may also be determined that the rotor is uncontrollable, to avoid safety hazards caused by excessive load on the wind turbine.

When it is determined that the rotor of the wind turbine is controllable, in step S503, the rotor of the wind turbine is controlled through a first mixed feedforward and feedback control manner based on the determined power increment $\Delta P$, to generate a first power increment $\Delta Pgen$.

Figure 6:
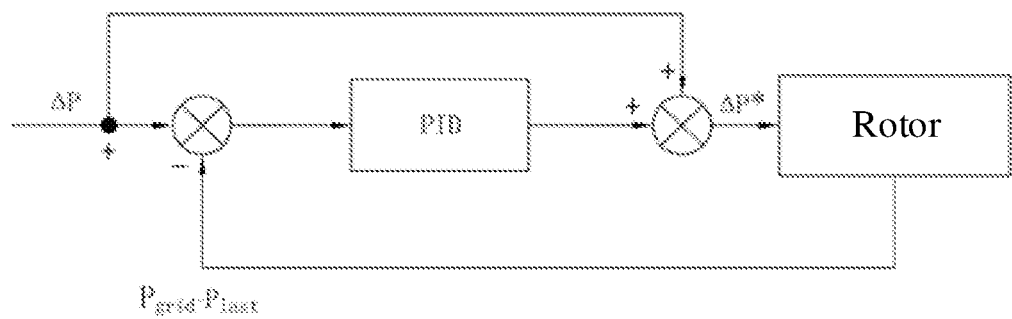
FIG. 6 is a diagram illustrating a control of a rotor of a wind turbine through a first mixed feedforward and feedback control manner.

FIG. 6 is a diagram illustrating a control of a rotor of a wind turbine through a first mixed feedforward and feedback control manner. As shown in FIG. 6, a first control component may be calculated through a proportional integral differential (PID) operation, by using the determined power increment $\Delta P$ as a given value and using a difference between a real-time grid-connected power value Pgrid of the wind turbine and a grid-connected power value Plast when determining the power increment required to be provided by the wind turbine and energy storage combined system as a feedback value, and then a sum of a feedforward amount and the first control component may be calculated as a rotor control target $\Delta P^*$ by using the determined power increment $\Delta P$ as the feedforward amount, and finally the rotor of the wind turbine may be controlled based on the calculated rotor control target $\Delta P^*$, to generate the first power increment $\Delta Pgen$. In this way, through feedback control, closed-loop control of the rotor is achieved, improving the stability and accuracy of the power response, and through feedforward control, the speed of the power response is increased. Herein, the control of the rotor may be achieved by controlling an electromagnetic torque. For example, the rotor control target $\Delta P^*$ may be converted into an electromagnetic torque increment $\Delta Te$ to apply to a given torque $Te^*$ of a machine-side AC/DC (rectifier), and AC/DC controls and tracks $Te^*$, and then the electromagnetic torque is applied to a generator G through the stator. The above-mentioned manner of electromagnetic torque control is well known to those skilled in the art and will not be described in detail herein.

Referring back to FIG. 5, in step S504, while controlling the rotor of the wind turbine, the energy storage device or both the energy storage device and a pitch system of the wind turbine may be controlled based on the determined power increment $\Delta P$, to generate a second power increment. As described above, the stability of the frequency response can be improved by controlling the energy storage device and the pitch system. Since the pitch system responds the slowest, only the energy storage device may be controlled to improve the stability of the frequency response, however, it is usually not common to control only the pitch system. However, the present disclosure is not limited thereto, and only the pitch system may be controlled to improve the stability of the frequency response. When controlling both the energy storage device and the pitch system, it is preferable to control the energy storage device to generate a power increment. When the power increment generated by controlling the energy storage device cannot meet a demand, the pitch system may be further controlled to generate an additional power increment as a supplement. On the other hand, since the second power increment is generated while controlling the rotor, the above-mentioned real-time grid-connected power value may be determined based on a converter side power of the wind turbine, the first power increment and the second power increment.

Specifically, under a condition that the energy storage device is controlled based on the determined power increment $\Delta P$, when the determined power increment $\Delta P$ is less than or equal to a maximum power increment $\Delta Pbat\_max$ that the energy storage device can provide, the determined power increment $\Delta P$ may be used as an energy storage control target to control the energy storage device to generate the second power increment $\Delta Pbat$. However, when the determined power increment $\Delta P$ is greater than the maximum power increment $\Delta Pbat\_max$ that the energy storage device can provide, the maximum power increment $\Delta Pbat\_max$ that the energy storage device can provide may be used as an energy storage control target to control the energy storage device, to generate the second power increment $\Delta Pbat$. Herein, a sum of the first power increment and the second power increment constitutes a total power increment. Therefore, the energy storage control target can be provided through a ramp-given manner to control the energy storage device, thereby ensuring that there will be as little impact as possible when the second power increment is superimposed with the first power increment, so that the real-time grid-connected power Pgrid remains stable. Of course, the energy storage control target may also be provided in other given manners (for example, a step-given manner, a ladder-given manner or an exponential curve-given manner).

On the other hand, in the case of controlling both the energy storage device and the pitch system of the wind turbine based on the determined power increment $\Delta P$, when the determined power increment $\Delta P$ is less than or equal to the maximum power increment $\Delta Pbat\_max$ that the energy storage device can provide, the determined power increment $\Delta P$ may be used as the energy storage control target to control only the energy storage device to generate the second power increment $\Delta Pbat$.

When the determined power increment $\Delta P$ is greater than the maximum power increment $\Delta Pbat\_max$ that the energy storage device can provide and less than or equal to a sum of the maximum power increment $\Delta Pbat\_max$ that the energy storage device can provide and a maximum power increment $\Delta Pwt\_max$ that the pitch system can provide, the maximum power increment $\Delta Pbat\_max$ that the energy storage device can provide may be used as the energy storage control target to control the energy storage device, and a difference between the determined power increment $\Delta P$ and the maximum power increment $\Delta Pwt\_max$ that the energy storage device can provide may be used as a pitch control target to control the pitch system, to generate the second power increment. In this case, the second power increment may be a sum of the power increment $\Delta Pbat$ generated by controlling the energy storage device and the power increment $\Delta Pwt$ generated by controlling the pitch system.

When the determined power increment $\Delta P$ is greater than the of the maximum power increment $\Delta Pbat\_max$ that the energy storage device can provide and the maximum power increment $\Delta Pwt\_max$ that the pitch system can provide, the maximum power increment $\Delta Pbat\_max$ that the energy storage device can provide may be used as the energy storage control target to control the energy storage device, and the maximum power increment $\Delta Pwt\_max$ that the pitch system can provide may be used as the pitch control target to control the pitch system, to generate the second power increment. In this case, the second power increment may be a sum of the power increment $\Delta Pbat$ generated by controlling the energy storage device and the power increment $\Delta Pwt$ generated by controlling the pitch system.

As described above, the energy storage control target may be provided in the ramp-given manner, the step-given manner, the ladder-given manner or the exponential curve-given manner, the pitch control target may also be provided in the ramp-given manner, the step-given manner, the ladder-given manner or the exponential curve-given manner. In addition, the energy storage control target and the pitch control target may be provided in different given manners. For example, when the energy storage control target is provided in the ramp-given manner, the pitch control target may be provided in the step-given manner, the ladder-given manner or the exponential curve-given manner.

When controlling the energy storage device, the energy storage device may be controlled to absorb electric energy or release stored electric energy, thereby generating a corresponding power increment. When controlling the pitch system, the pitch system may be controlled to perform a pitch opening operation or a pitch retraction operation (i.e., change a pitch angle), thereby generating a corresponding power increment. The operation methods of the above-mentioned energy storage device and pitch system are well known to those skilled in the art, and will not be described in detail herein.

When controlling the rotor of the wind turbine for a predetermined time period, in step S505, controlling the rotor of the wind turbine may be stopped, and the energy storage device or both the energy storage device and the pitch system may be controlled through a second mixed feedforward and feedback control manner based on the determined power increment $\Delta P$, to generate a third power increment. Herein, the predetermined time period may a time period required for the second power increment ($\Delta Pbat$ or the sum of $\Delta Pbat$ and $\Delta Pwt$) to reach a steady state. Generally speaking, this time period cannot exceed a maximum time period that the rotor can support, usually no more than 5 seconds. On the other hand, this time period cannot be too short, too short time period means that a slope of the ramp-given manner is relatively large. A ramp that is too large will challenge the stability of the mixed feedforward and feedback control (i.e., closed-loop control) manner. For example, if the second power increment rises rapidly, in order to keep the real-time grid-connected power stable, the rotor needs to quickly reduce the power. If the reduction is not timely, a fluctuation amount of the real-time grid-connected power will exceed a limit. After stopping controlling the rotor of the wind turbine, in order to keep the real-time grid-connected power stable, it is still necessary to control the energy storage device or both the energy storage device and the pitch system through a mixed feedforward and feedback control (i.e., closed-loop control) manner. For example, when a wind speed decreases and a wind power decreases, in order to keep the real-time grid-connected power stable, the power increment generated by controlling the energy storage device and the pitch system needs to increase, which requires to perform closed-loop control of the energy storage device and the pitch control system.

Specifically, under a condition that the energy storage device is controlled through the second mixed feedforward and feedback control manner based on the determined power increment $\Delta P$, a second control component may be calculated through a proportional integral differential (PID) operation, by using the determined power increment $\Delta P$ as a given value and using a difference between a real-time grid-connected power value P'grid of the wind turbine and a grid-connected power value Plast when determining the power increment required to be provided by the wind turbine and energy storage combined system as a feedback value, and then a sum of a feedforward amount and the second control component may be calculated as the energy storage device control target $\Delta P^*$ by using the determined power increment $\Delta P$ as the feedforward amount, and finally the energy storage device may be controlled based on the calculated energy storage device control target $\Delta P^*$, to generate the third power increment $\Delta Pbat$. Herein, the real-time grid-connected power value may be determined based on the converter side power of the wind turbine and the third power increment.

On the other hand, under a condition that both the energy storage device and the pitch system are controlled through the second mixed feedforward and feedback control manner based on the determined power increment $\Delta P$, a second control component may be calculated through a proportional integral differential (PID) operation, by using the determined power increment $\Delta P$ as a given value and using a difference between a real-time grid-connected power value P'grid of the wind turbine and a grid-connected power value Plast when determining the power increment required to be provided by the wind turbine and energy storage combined system as a feedback value, and then a sum of a feedforward amount and the second control component may be calculated as an energy storage and pitch joint control target $\Delta P^*$ by using the determined power increment as the feedforward amount, and finally both the energy storage device and the pitch system may be controlled based on the calculated energy storage and pitch joint control target $\Delta P^*$, to generate the third power increment.

Furthermore, when the calculated energy storage and pitch joint control target $\Delta P^*$ is less than or equal to the maximum power increment $\Delta Pbat\_max$ that the energy storage device can provide, only the energy storage device may be controlled based on the calculated energy storage and pitch joint control target $\Delta P^*$, to generate the third power increment $\Delta Pbat$.

When the calculated energy storage and pitch joint control target $\Delta P^*$ is greater than the maximum power increment $\Delta Pbat\_max$ that the energy storage device can provide and is less than or equal to a sum of the maximum power increment $\Delta Pbat\_max$ that the energy storage device can provide and the maximum power increment $\Delta Pwt\_max$ that the pitch system can provide, the maximum power increment $\Delta Pbat\_max$ that the energy storage device can provide may be used as an energy storage device control target to control the energy storage device, and a difference between the energy storage and pitch joint control target and the maximum power increment $\Delta Pbat\_max$ that the energy storage device can provide may be used as a pitch system control target to control the pitch system, to generate the third power increment. In this case, the third power increment may be a sum of the power increment $\Delta Pbat$ generated by controlling the energy storage device and the power increment $\Delta Pwt$ generated by controlling the pitch system.

When the calculated energy storage and pitch joint control target $\Delta P^*$ is greater than the sum of the maximum power increment $\Delta Pbat\_max$ that the energy storage device can provide and the maximum power increment $\Delta Pwt\_max$ that the pitch system can provide, the maximum power increment $\Delta Pbat\_max$ that the energy storage device can provide may be used as the energy storage device control target to control the energy storage device, and the maximum power increment $\Delta Pwt\_max$ that the pitch system can provide as the pitch system control target to control the pitch system, to generate the third power increment. As described above, in this case, the third power increment may be the sum of the power increment $\Delta Pbat$ generated by controlling the energy storage device and the power increment $\Delta Pwt$ generated by controlling the pitch system.

As described above, when controlling both the energy storage device and the pitch system, it is preferable to control the energy storage device to generate a power increment. When the power increment generated by controlling the energy storage device cannot meet a demand, the pitch system may be further controlled to generate an additional power increment as a supplement.

Alternatively, when it is determined that the rotor of the wind turbine is uncontrollable, in step S506, the energy storage device or both the energy storage device and the pitch system may be controlled through the second mixed feedforward and feedback control manner based on the determined power increment ΔP, to generate the third power increment. In step S506, except that there is no need to stop controlling the rotor (the reason is that the rotor is not controlled at all), the control of the energy storage device or the control of both the energy storage device and the pitch system is exactly the same as the control of the energy storage device or the control of both the energy storage device and the pitch system in step S505, which will not be described again herein.

As described above, when controlling both the energy storage device and the pitch system, it is preferable to control the energy storage device to generate a power increment. When the power increment generated by controlling the energy storage device cannot meet a demand, the pitch system may be further controlled to generate an additional power increment as a supplement.

According to the wind turbine and energy storage combined frequency regulation method of the present disclosure, when performing frequency regulation, the rotor of the wind turbine may be controlled first through a mixed feedforward and feedback control manner to generate a power increment, thereby improving a response speed. At the same time, due to a limited support time of the rotor, in order to avoid a fluctuation in a grid-connected power of the wind turbine caused by withdrawing control of the rotor, the energy storage device or both the energy storage device and the pitch system may be controlled at the same time to generate an additional power increment. At the same time, after the control of the rotor is withdrawn, the energy storage device or both the energy storage device and the pitch system may be controlled through a mixed feedforward and feedback control manner to generate a power increment and maintain stable grid-connected power of the wind turbine. In addition, under a condition that the rotor is uncontrollable, both the energy storage device and the pitch system may be controlled directly through a mixed feedforward and feedback control manner to generate a power increment, thereby improving the response speed and maintaining stable power through control of the energy storage device, and maintaining stable power through control of the pitch system.

Figure 7:
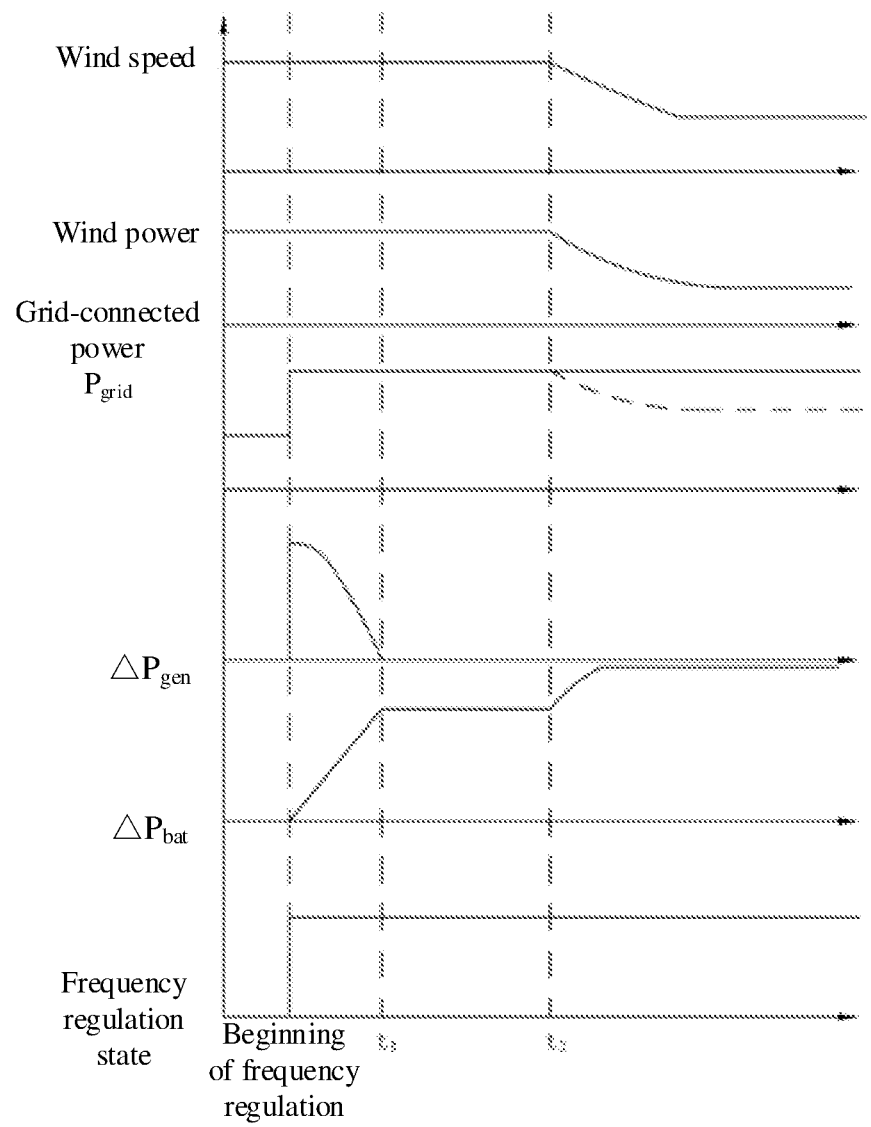
FIG. 7 is a diagram illustrating a response curve of a wind turbine and energy storage combined frequency regulation method according to an embodiment of the present disclosure.

FIG. 7 is a diagram illustrating a response curve of a wind turbine and energy storage combined frequency regulation method according to an embodiment of the present disclosure. In the wind turbine and energy storage combined frequency regulation method shown in FIG. 7, the rotor of the wind turbine is controllable, and only the energy storage device is used as a supplement to the rotor.

Referring to FIG. 7, at the beginning time t0 of frequency regulation, a power increment ΔPgen is immediately generated by controlling a rotor, and a real-time grid-connected power value Pgrid is increased, thereby realizing the frequency regulation response. At the same time, an energy storage control target is provided through a ramp-given manner to control the energy storage device, to generate a power increment ΔPbat. As the power increment ΔPbat increases, the power increment ΔPgen may decrease. At time t1, the power increment ΔPbat reaches a steady state and the control of the rotor is withdrawn, at this time, the real-time grid-connected power value Pgrid may be kept stable. Subsequently, when the wind power decreases due to the decrease of the wind speed at time t2, since it has been switched to control the energy storage device through the mixed feedforward and feedback control (i.e., closed-loop control) manner, the power increment ΔPbat can gradually increase, thereby maintaining stable real-time grid-connected power value Pgrid.

Figure 8:
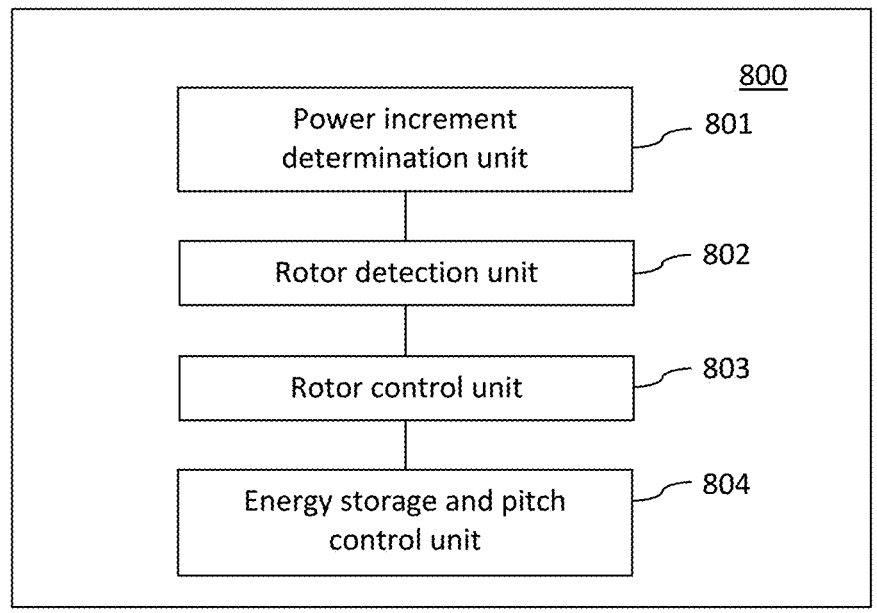
FIG. 8 is a block diagram illustrating a wind turbine and energy storage combined frequency regulation device according to an embodiment of the present disclosure.

FIG. 8 is a block diagram illustrating a wind turbine and energy storage combined frequency regulation device according to an embodiment of the present disclosure. As an example, the wind turbine and energy storage combined frequency regulation device according to an embodiment of the present disclosure may be provided in a converter controller of a wind turbine, however, the present disclosure is not limited thereto. For example, the wind turbine and energy storage combined frequency regulation device according to an embodiment of the present disclosure may be provided in a main controller of the wind turbine, or in a dedicated controller of the wind turbine.

Referring to FIG. 8, the wind turbine and energy storage combined frequency regulation device 800 according to an embodiment of the present disclosure may include a power increment determination unit 801, a rotor detection unit 802, a rotor control unit 803 and an energy storage and pitch control unit 804.

The power increment determination unit 801 may determine, in response to detecting a change in a grid frequency, a power increment required to be provided by a wind turbine and energy storage combined system. As described above, the wind turbine and energy storage combined system includes a wind turbine and an energy storage device connected to the wind turbine. The power increment determination unit 801 may use, based on an amount of change in the grid frequency, a predetermined frequency regulation power calculation curve to determine the power increment required to be provided by the wind turbine and energy storage combined system.

The rotor detection unit 802 may determine whether a rotor of the wind turbine is controllable. Specifically, under a condition that an output power of the wind turbine is less than or equal to a product of a rated power of the wind turbine and a predetermined coefficient, or under a condition that the output power of the wind turbine is greater than or equal to the rated power of the wind turbine, the rotor detection unit 802 may determine that the rotor of the wind turbine is uncontrollable. Herein, the predetermined coefficient is a positive number less than 1, such as but not limited to 0.1.

The rotor control unit 803 may control, in response to determining that the rotor of the wind turbine is controllable, the rotor of the wind turbine through a first mixed feedforward and feedback control manner based on the determined power increment, to generate a first power increment. Specifically, the rotor control unit 803 may first calculate a first control component through a proportional integral differential operation, by using the determined power increment as a given value and using a difference between a real-time grid-connected power value of the wind turbine and a grid-connected power value when determining the power increment required to be provided by the wind turbine and energy storage combined system as a feedback value, and then calculate a sum of a feedforward amount and the first control component as a rotor control target by using the determined power increment as the feedforward amount, and finally control the rotor of the wind turbine based on the calculated rotor control target, to generate the first power increment.

The energy storage and pitch control unit 804 may control, while controlling the rotor of the wind turbine, the energy storage device or both the energy storage device and a pitch system of the wind turbine based on the determined power increment, to generate a second power increment. In this case, the real-time grid-connected power value may be determined based on the converter side power of the wind turbine, the first power increment, and the second power increment.

Specifically, the energy storage and pitch control unit 804 may use, in response to the determined power increment being less than or equal to a maximum power increment that the energy storage device can provide, the determined power increment as an energy storage control target to control the energy storage device, to generate the second power increment. In addition, the energy storage and pitch control unit 804 may use, in response to the determined power increment being greater than the maximum power increment that the energy storage device can provide, the maximum power increment that the energy storage device can provide as the energy storage control target to control the energy storage device, to generate the second power increment. In addition to the ramp-given manner, the energy storage control target may also be provided through the step-given manner, the ladder-given manner or the exponential curve-given manner.

Optionally, the energy storage and pitch control unit 804 may use, in response to the determined power increment being less than or equal to a maximum power increment that the energy storage device can provide, the determined power increment as an energy storage control target to control only the energy storage device, to generate the second power increment. In addition, the energy storage and pitch control unit 804 may, in response to the determined power increment being greater than the maximum power increment that the energy storage device can provide and less than or equal to a sum of the maximum power increment that the energy storage device can provide and a maximum power increment that the pitch system can provide, use the maximum power increment that the energy storage device can provide as the energy storage control target to control the energy storage device, and use a difference between the determined power increment and the maximum power increment that the energy storage device can provide as a pitch control target to control the pitch system, to generate the second power increment. In addition, the energy storage and pitch control unit 804 may, in response to the determined power increment being greater than the sum of the maximum power increment that the energy storage device can provide and the maximum power increment that the pitch system can provide, use the maximum power increment that the energy storage device can provide as the energy storage control target to control the energy storage device, and use the maximum power increment that the pitch system can provide as the pitch control target to control the pitch system, to generate the second power increment. Herein, the energy storage control target may be provided through the ramp-given manner, the step-given manner, the ladder-given manner or the exponential curve-given manner. In addition, the pitch control target may be provided through the ramp-given manner, the step-given manner, the ladder-given manner or the exponential curve-given manner.

According to an embodiment of the present disclosure, in response to controlling the rotor of the wind turbine for a predetermined time period, the rotor control unit 803 may stop controlling the rotor of the wind turbine, and the energy storage and pitch control unit 804 may control the energy storage device or both the energy storage device and the pitch system through a second mixed feedforward and feedback control manner based on the determined power increment, to generate a third power increment. Herein, the predetermined time period may be a time period required for the second power increment to reach a steady state. In addition, the energy storage and pitch control unit 804 may control, in response to determining that the rotor of the wind turbine is uncontrollable, the energy storage device or both the energy storage device and the pitch system through the second mixed feedforward and feedback control manner based on the determined power increment, to generate the third power increment.

Specifically, the energy storage and pitch control unit 804 may first calculate a second control component through a proportional integral differential operation, by using the determined power increment as a given value and using a difference between a real-time grid-connected power value of the wind turbine and a grid-connected power value when determining the power increment required to be provided by the wind turbine and energy storage combined system as a feedback value, and then calculate a sum of a feedforward amount and the second control component as an energy storage device control target by using the determined power increment as the feedforward amount, and finally control the energy storage device based on the calculated energy storage device control target, to generate the third power increment. Herein, the real-time grid-connected power value may be determined based on the converter side power of the wind turbine and the third power increment.

Optionally, the energy storage and pitch control unit 804 may first calculate a second control component through a proportional integral differential operation, by using the determined power increment as a given value and using a difference between a real-time grid-connected power value of the wind turbine and a grid-connected power value when determining the power increment required to be provided by the wind turbine and energy storage combined system as a feedback value, and then calculate a sum of a feedforward amount and the second control component as an energy storage and pitch joint control target by using the determined power increment as the feedforward amount, and finally control both the energy storage device and the pitch system based on the calculated energy storage and pitch joint control target, to generate the third power increment. In this case, the energy storage and pitch control unit 804 may control, in response to the calculated energy storage and pitch joint control target being less than or equal to a maximum power increment that the energy storage device can provide, only the energy storage device based on the calculated energy storage and pitch joint control target, to generate the third power increment. In addition, the energy storage and pitch control unit 804 may, in response to the calculated energy storage and pitch joint control target being greater than the maximum power increment that the energy storage device can provide and less than or equal to a sum of the maximum power increment that the energy storage device can provide and a maximum power increment that the pitch system can provide, use the maximum power increment that the energy storage device can provide as an energy storage device control target to control the energy storage device, and use a difference between the energy storage and pitch joint control target and the maximum power increment that the energy storage device can provide as a pitch system control target to control the pitch system, to generate the third power increment. In addition, the energy storage and pitch control unit 804 may, in response to the calculated energy storage and pitch joint control target being greater than the sum of the maximum power increment that the energy storage device can provide and the maximum power increment that the pitch system can provide, use the maximum power increment that the energy storage device can provide as the energy storage device control target to control the energy storage device, and use the maximum power increment that the pitch system can provide as the pitch system control target to control the pitch system, to generate the third power increment.

Figure 9:
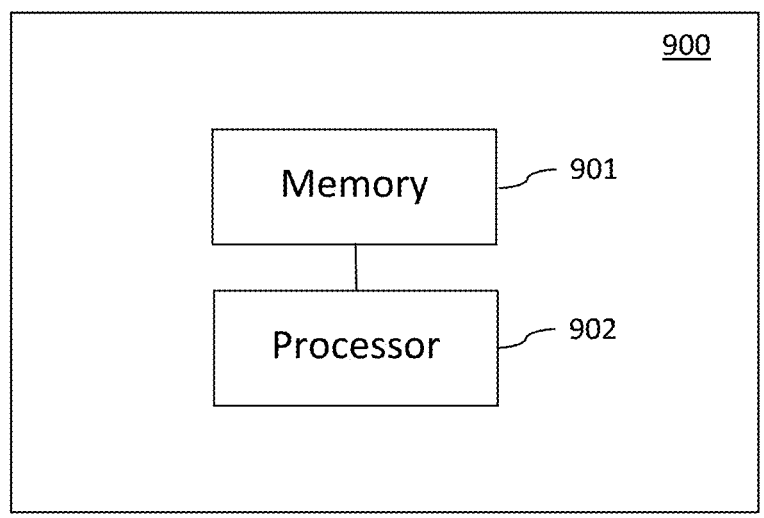
FIG. 9 is a block diagram illustrating a controller according to an embodiment of the present disclosure.

FIG. 9 is a block diagram illustrating a controller according to an embodiment of the present disclosure.

Referring to FIG. 9, a controller 900 according to an embodiment of the present disclosure may be implemented in a wind turbine and energy storage combined system, for example, may be implemented as a main controller of a wind turbine. The controller 900 disclosed according to this embodiment may include a processor 910 and a memory 920. The processor 910 may include (but is not limited to) a central processing unit (CPU), a digital signal processor (DSP), a microcomputer, a field programmable gate array (FPGA), a system on a chip (SoC), a microprocessor, an application specific integrated circuit (ASIC) etc. The memory 920 may store computer programs to be executed by the processor 910. The memory 920 may include a high-speed random access memory and/or a non-volatile computer-readable storage medium. When the processor 910 executes the computer programs stored in the memory 920, the wind turbine and energy storage combined frequency regulation method as described above may be implemented.

Optionally, the controller 900 may communicate with various other components in the wind turbine and energy storage combined system in a wired/wireless communication manner, and may also communicate with other devices in a wind farm in a wired/wireless communication manner. In addition, the controller 900 may communicate with devices outside the wind farm in a wired/wireless communication manner.

The wind turbine and energy storage combined frequency regulation method according to embodiments of the present disclosure may be written as a computer program and stored on a computer-readable storage medium. When the computer program is executed by the processor, the wind turbine and energy storage combined frequency regulation method as described above may be implemented. Examples of the computer-readable storage medium include: a read only memory (ROM), a random access programmable read only memory (PROM), an electrically erasable programmable read only memory (EEPROM), a random access memory (RAM), a dynamic random access memory (DRAM), a static random access memory (SRAM), a flash memory, a non-volatile memory, a CD-ROM, a CD-R, a CD+R, a CD-RW, a CD+RW, a DVD-ROM, a DVD-R, a DVD+R, a DVD-RW, a DVD+RW, a DVD-RAM, a BD-ROM, a BD-R, a BD-R LTH, a BD-RE, a Blu-ray or an optical disk storage, a hard disk drive (HDD), a solid state drive (SSD), a card storage (such as a multimedia card, a secure digital (SD) card or an extreme digital (XD) card), a magnetic tape, a floppy disk, a magneto-optical data storage device, an optical data storage device, a hard disk, a solid state disk and any other device, said any other device is configured to store a computer program and any associated data, data files and data structures in a non-transitory manner and to provide the computer program and any associated data, data files and data structures to a processor or computer to cause the processor or computer to execute the computer program. In one example, the computer program and any associated data, data files and data structures are distributed over a networked computer system such that the computer program and any associated data, data files and data structures are stored, accessed, and executed by one or more processors or computers in a distributed manner.

According to the wind turbine and energy storage combined frequency regulation method and the wind turbine and energy storage combined frequency regulation device of the present disclosure, when performing frequency regulation, the rotor of the wind turbine may be controlled first through a mixed feedforward and feedback control manner to generate a power increment, thereby improving a response speed. At the same time, due to a limited support time of the rotor, in order to avoid a fluctuation in a grid-connected power of the wind turbine caused by withdrawing control of the rotor, the energy storage device or both the energy storage device and the pitch system may be controlled at the same time to generate an additional power increment. At the same time, after the control of the rotor is withdrawn, the energy storage device or both the energy storage device and the pitch system may be controlled through a mixed feedforward and feedback control manner to generate a power increment and maintain stable grid-connected power of the wind turbine. In addition, under a condition that the rotor is uncontrollable, both the energy storage device and the pitch system may be controlled directly through the mixed feedforward and feedback control manner to generate a power increment, thereby improving the response speed and maintaining stable power through control of the energy storage device, and maintaining stable power through control of the pitch system.

While certain embodiments of the present disclosure have been shown and described, it will be understood by those skilled in the art that various modifications may be made to these embodiments without departing from the principle and spirit of the present disclosure, the scope of which is defined by the appended claims and their equivalents.

The invention claimed is:

1. A wind turbine and energy storage combined frequency regulation method, comprising:
   in response to detecting a change in a grid frequency, determining a power increment required to be provided by a wind turbine and energy storage combined system, wherein the wind turbine and energy storage combined system comprises a wind turbine and an energy storage device connected to the wind turbine;
   determining whether a rotor of the wind turbine is controllable;
   in response to determining that the rotor of the wind turbine is controllable, controlling the rotor of the wind turbine through a first mixed feedforward and feedback control manner based on the determined power increment, to generate a first power increment, at least by:
      calculating a first control component based on the determined power increment, a real-time grid-connected power value of the wind turbine, and a grid-connected power value when determining the power increment required to be provided by the wind turbine and energy storage combined system;
      calculating a sum of a first feedforward amount and the first control component as a rotor control target, wherein the determined power increment is used as the first feedforward amount; and
      controlling the rotor of the wind turbine based on the calculated rotor control target to generate the first power increment; and while controlling the rotor of the wind turbine, controlling the energy storage device or both the energy storage device and a pitch system of the wind turbine based on the determined power increment, to generate a second power increment.

2. The wind turbine and energy storage combined frequency regulation method of claim 1, further comprising:
in response to determining that the rotor of the wind turbine is uncontrollable, controlling the energy storage device or both the energy storage device and the pitch system through a second mixed feedforward and feedback control manner based on the determined power increment, to generate a third power increment.

3. The wind turbine and energy storage combined frequency regulation method of claim 1, wherein the step of determining a power increment required to be provided by a wind turbine and energy storage combined system comprises:
based on the change in the grid frequency, determining, according to a predetermined frequency regulation power calculation curve, the power increment required to be provided by the wind turbine and energy storage combined system.

4. The wind turbine and energy storage combined frequency regulation method of claim 1, wherein the step of determining whether a rotor of the wind turbine is controllable comprises:
in response to an output power of the wind turbine being less than or equal to a product of a rated power of the wind turbine and a predetermined coefficient, or in response to the output power of the wind turbine being greater than or equal to the rated power of the wind turbine, determining that the rotor of the wind turbine is uncontrollable, wherein the predetermined coefficient is a positive number less than 1.

5. The wind turbine and energy storage combined frequency regulation method of claim 1, wherein calculating the first control component comprises:
calculating the first control component through a proportional integral differential operation, by using the determined power increment as a given value and using a difference between the real-time grid-connected power value of the wind turbine and the grid-connected power value when determining the power increment required to be provided by the wind turbine and energy storage combined system as a feedback value.

6. The wind turbine and energy storage combined frequency regulation method of claim 1, wherein the step of controlling the energy storage device based on the determined power increment comprises:
in response to the determined power increment being less than or equal to a maximum power increment that the energy storage device provides, using the determined power increment as an energy storage control target to control the energy storage device, to generate the second power increment; or
in response to the determined power increment being greater than the maximum power increment that the energy storage device provides, using the maximum power increment that the energy storage device provides as the energy storage control target to control the energy storage device, to generate the second power increment.

7. The wind turbine and energy storage combined frequency regulation method of claim 1, wherein the step of controlling both the energy storage device and the pitch system of the wind turbine based on the determined power increment comprises:
in response to the determined power increment being less than or equal to a maximum power increment that the energy storage device provides, using the determined power increment as an energy storage control target to control only the energy storage device, to generate the second power increment;
in response to the determined power increment being greater than the maximum power increment that the energy storage device provides and less than or equal to a sum of the maximum power increment that the energy storage device provides and a maximum power increment that the pitch system provides, using the maximum power increment that the energy storage device provides as the energy storage control target to control the energy storage device, and using a difference between the determined power increment and the maximum power increment that the energy storage device provides as a pitch control target to control the pitch system, to generate the second power increment; or
in response to the determined power increment being greater than the sum of the maximum power increment that the energy storage device provides and the maximum power increment that the pitch system provides, using the maximum power increment that the energy storage device provides as the energy storage control target to control the energy storage device, and using the maximum power increment that the pitch system provides as the pitch control target to control the pitch system, to generate the second power increment.

8. The wind turbine and energy storage combined frequency regulation method of claim 1, further comprising:
in response to controlling the rotor of the wind turbine for a predetermined time period, stopping controlling the rotor of the wind turbine, and controlling the energy storage device or both the energy storage device and the pitch system through a second mixed feedforward and feedback control manner based on the determined power increment, to generate a third power increment, wherein the predetermined time period is a time period required for the second power increment to reach a steady state.

9. The wind turbine and energy storage combined frequency regulation method of claim 8, wherein the step of controlling both the energy storage device and the pitch system through the second mixed feedforward and feedback control manner based on the determined power increment comprises:
calculating a second control component through a proportional integral differential operation, by using the determined power increment as a given value and using a difference between the real-time grid-connected power value of the wind turbine and the grid-connected power value when determining the power increment required to be provided by the wind turbine and energy storage combined system as a feedback value;
calculating a sum of a second feedforward amount and the second control component as an energy storage and pitch joint control target, wherein the determined power increment is used as the second feedforward amount; and
controlling both the energy storage device and the pitch system based on the calculated energy storage and pitch joint control target, to generate the third power increment.

10. The wind turbine and energy storage combined frequency regulation method of claim 9, wherein the step of controlling both the energy storage device and the pitch system based on the calculated energy storage and pitch joint control target comprises:

in response to the calculated energy storage and pitch joint control target being less than or equal to a maximum power increment that the energy storage device provides, controlling only the energy storage device based on the calculated energy storage and pitch joint control target, to generate the third power increment;

in response to the calculated energy storage and pitch joint control target being greater than the maximum power increment that the energy storage device provides and less than or equal to a sum of the maximum power increment that the energy storage device provides and a maximum power increment that the pitch system provides, using the maximum power increment that the energy storage device provides as an energy storage device control target to control the energy storage device, and using a difference between the energy storage and pitch joint control target and the maximum power increment that the energy storage device provides as a pitch system control target to control the pitch system, to generate the third power increment; or in response to the calculated energy storage and pitch joint control target being greater than the sum of the maximum power increment that the energy storage device provides and the maximum power increment that the pitch system provides, using the maximum power increment that the energy storage device provides as the energy storage device control target to control the energy storage device, and using the maximum power increment that the pitch system provides as the pitch system control target to control the pitch system, to generate the third power increment.

11. The wind turbine and energy storage combined frequency regulation method of claim 8, wherein controlling the energy storage device through the second mixed feedforward and feedback control manner based on the determined power increment comprises:

calculating a second control component through a proportional integral differential operation, by using the determined power increment as a given value and using a difference between the real-time grid-connected power value of the wind turbine and the grid-connected power value when determining the power increment required to be provided by the wind turbine and energy storage combined system as a feedback value;

calculating a sum of a second feedforward amount and the second control component as an energy storage device control target, wherein the determined power increment is used as the second feedforward amount; and controlling the energy storage device based on the calculated energy storage device control target, to generate the third power increment.

12. A controller, comprising:
a processor; and
a memory storing computer programs that, when executed by the processor, implement a wind turbine and energy storage combined frequency regulation method comprising:

in response to detecting a change in a grid frequency, determining a power increment required to be provided by a wind turbine and energy storage combined system, wherein the wind turbine and energy storage combined system comprises a wind turbine and an energy storage device connected to the wind turbine;

determining whether a rotor of the wind turbine is controllable;

in response to determining that the rotor of the wind turbine is controllable, controlling the rotor of the wind turbine through a first mixed feedforward and feedback control manner based on the determined power increment, to generate a first power increment, at least by:

calculating a first control component based on the determined power increment, a real-time grid-connected power value of the wind turbine, and a grid-connected power value when determining the power increment required to be provided by the wind turbine and energy storage combined system;

calculating a sum of a first feedforward amount and the first control component as a rotor control target, wherein the determined power increment is used as the first feedforward amount; and controlling the rotor of the wind turbine based on the calculated rotor control target to generate the first power increment; and while controlling the rotor of the wind turbine, controlling the energy storage device or both the energy storage device and a pitch system of the wind turbine based on the determined power increment, to generate a second power increment.

13. The controller of claim 12, wherein the wind turbine and energy storage combined frequency regulation method further comprises:

in response to determining that the rotor of the wind turbine is uncontrollable, controlling the energy storage device or both the energy storage device and the pitch system through a second mixed feedforward and feedback control manner based on the determined power increment, to generate a third power increment.

14. The controller of claim 12, wherein the step of determining a power increment required to be provided by a wind turbine and energy storage combined system comprises:

based on the change in the grid frequency, determining, according to a predetermined frequency regulation power calculation curve, the power increment required to be provided by the wind turbine and energy storage combined system.

15. The controller of claim 12, wherein the step of determining whether a rotor of the wind turbine is controllable comprises:

in response to an output power of the wind turbine being less than or equal to a product of a rated power of the wind turbine and a predetermined coefficient, or in response to the output power of the wind turbine being greater than or equal to the rated power of the wind turbine, determining that the rotor of the wind turbine is uncontrollable, wherein the predetermined coefficient is a positive number less than 1.

16. The controller of claim 12, wherein controlling the energy storage device based on the determined power increment comprises:

in response to the determined power increment being less than or equal to a maximum power increment that the energy storage device provides, using the determined power increment as an energy storage control target to control the energy storage device, to generate the second power increment; or in response to the determined power increment being greater than the maximum power increment that the energy storage device provides, using the maximum power increment that the energy storage device provides as the energy storage control target to control the energy storage device, to generate the second power increment.

17. The controller of claim 12, wherein controlling both the energy storage device and the pitch system of the wind turbine based on the determined power increment comprises:

in response to the determined power increment being less than or equal to a maximum power increment that the energy storage device provides, using the determined power increment as an energy storage control target to control only the energy storage device, to generate the second power increment;

in response to the determined power increment being greater than the maximum power increment that the energy storage device provides and less than or equal to a sum of the maximum power increment that the energy storage device provides and a maximum power increment that the pitch system provides, using the maximum power increment that the energy storage device provides as the energy storage control target to control the energy storage device, and using a difference between the determined power increment and the maximum power increment that the energy storage device provides as a pitch control target to control the pitch system, to generate the second power increment; or in response to the determined power increment being greater than the sum of the maximum power increment that the energy storage device provides and the maximum power increment that the pitch system provides, using the maximum power increment that the energy storage device provides as the energy storage control target to control the energy storage device, and using the maximum power increment that the pitch system provides as the pitch control target to control the pitch system, to generate the second power increment.

18. The controller of claim 12, wherein the wind turbine and energy storage combined frequency regulation method further comprises:

in response to controlling the rotor of the wind turbine for a predetermined time period, stopping controlling the rotor of the wind turbine, and controlling the energy storage device or both the energy storage device and the pitch system through a second mixed feedforward and feedback control manner based on the determined power increment, to generate a third power increment, wherein the predetermined time period is a time period required for the second power increment to reach a steady state.

19. The controller of claim 18, wherein:

controlling the energy storage device through the second mixed feedforward and feedback control manner based on the determined power increment comprises:

calculating a second control component through a proportional integral differential operation, by using the determined power increment as a given value and using a difference between the real-time grid-connected power value of the wind turbine and the grid-connected power value when determining the power increment required to be provided by the wind turbine and energy storage combined system as a feedback value;

calculating a sum of a second feedforward amount and the second control component as an energy storage device control target, wherein the determined power increment is used as the second feedforward amount; and controlling the energy storage device based on the calculated energy storage device control target, to generate the third power increment; or wherein controlling both the energy storage device and the pitch system through the second mixed feedforward and feedback control manner based on the determined power increment comprises:

calculating the second control component through the proportional integral differential operation, by using the determined power increment as the given value and using the difference between the real-time grid-connected power value of the wind turbine and the grid-connected power value when determining the power increment required to be provided by the wind turbine and energy storage combined system as the feedback value;

calculating the sum of the second feedforward amount and the second control component as an energy storage and pitch joint control target, wherein the determined power increment is used as the second feedforward amount; and controlling both the energy storage device and the pitch system based on the calculated energy storage and pitch joint control target, to generate the third power increment.

20. A wind turbine and energy storage combined system, comprising:

a wind turbine;

an energy storage device connected to the wind turbine; and a controller, comprising:

a processor; and a memory storing computer programs that, when executed by the processor, implement a wind turbine and energy storage combined frequency regulation method comprising:

in response to detecting a change in a grid frequency, determining a power increment required to be provided by the wind turbine and energy storage combined system;

determining whether a rotor of the wind turbine is controllable;

in response to determining that the rotor of the wind turbine is controllable, controlling the rotor of the wind turbine through a first mixed feedforward and feedback control manner based on the determined power increment, to generate a first power increment, at least by:

calculating a first control component based on the determined power increment, a real-time grid-connected power value of the wind turbine, and a grid-connected power value when determining the power increment required to be provided by the wind turbine and energy storage combined system;

calculating a sum of a first feedforward amount and the first control component as a rotor control target, wherein the determined power increment is used as the first feedforward amount; and controlling the rotor of the wind turbine based on the calculated rotor control target to generate the first power increment; and while controlling the rotor of the wind turbine, controlling the energy storage device or both the energy storage device and a pitch system of the wind turbine based on the determined power increment, to generate a second power increment.

\* \* \* \* \*